(12) United States Patent
Kotecha et al.

(10) Patent No.: US 9,007,899 B2
(45) Date of Patent: Apr. 14, 2015

(54) QUALITY OF SERVICE TREATEMENT FOR APPLICATIONS WITH MULTIPLE TRAFFIC CLASSES

(75) Inventors: Lalit R. Kotecha, San Ramon, CA (US); William H. Stone, Doylestown, PA (US); Chris S. Neisinger, Danville, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 218 days.

(21) Appl. No.: 13/491,312

(22) Filed: Jun. 7, 2012

(65) Prior Publication Data
US 2013/0329550 A1 Dec. 12, 2013

(51) Int. Cl.
*H04L 12/26* (2006.01)
*H04L 12/851* (2013.01)

(52) U.S. Cl.
CPC ............ *H04L 47/24* (2013.01); *H04L 47/2425* (2013.01)

(58) Field of Classification Search
CPC . H04L 47/24; H04L 47/2408; H04L 47/2425; H04L 47/2433; H04L 47/2441; H04L 47/2483; H04L 47/2491
USPC .............. 370/230–236.2, 329, 341, 437, 443, 370/444, 468, 477
See application file for complete search history.

(56) References Cited

U.S. PATENT DOCUMENTS

| | | | |
|---|---|---|---|
| 2006/0039335 A1* | 2/2006 | Ono et al. | 370/338 |
| 2008/0117913 A1* | 5/2008 | Tatar et al. | 370/392 |
| 2011/0019556 A1* | 1/2011 | Hsin et al. | 370/252 |
| 2011/0134888 A1* | 6/2011 | Lin et al. | 370/335 |
| 2012/0099564 A1* | 4/2012 | Bekiares et al. | 370/336 |
| 2012/0218894 A1* | 8/2012 | Assarpour et al. | 370/235 |

\* cited by examiner

*Primary Examiner* — Mang Yeung

(57) ABSTRACT

A system may receive a connection request, from a user device, that includes information identifying a particular application; identify that the particular application is associated with a group of classes of traffic; establish a group of bearer channels that are associated with the group of classes of traffic, the group of bearer channels being associated with a group of different levels of quality of service ("QoS"); process, via a first bearer channel and according to a first level of QoS, first traffic associated with the user device and the particular application; and process, via a second bearer channel of the group of bearer channels, according to a second level of QoS, second traffic associated with the user device and the particular application, the second bearer channel being different from the first bearer channel, and the second level of QoS being different from the first level of QoS.

20 Claims, 7 Drawing Sheets

QUALITY OF SERVICE TREATEMENT FOR APPLICATIONS WITH MULTIPLE TRAFFIC CLASSES

BACKGROUND

User devices, such as cellular telephones, may connect to networks, such as cellular networks, the Internet, etc., in order to run network-based applications. For example, a cellular telephone may execute an online gaming application by communicating, via one or more networks, with an online gaming server. Network devices associated with the networks and/or the user device may provide a particular quality of service ("QoS") to the gaming application, in order to provide a satisfactory user experience.

DETAILED DESCRIPTION OF PREFERRED EMBODIMENTS

The following detailed description refers to the accompanying drawings. The same reference numbers in different drawings may identify the same or similar elements.

A system and/or method, described herein, may enable a networking system and/or a user device to provide multiple quality of service ("QoS") levels to a particular application, such as a network-based application being executed by the user device. In some implementations, the particular application may be associated with multiple classes of traffic, which may be associated with different QoS levels.

Figure 1:
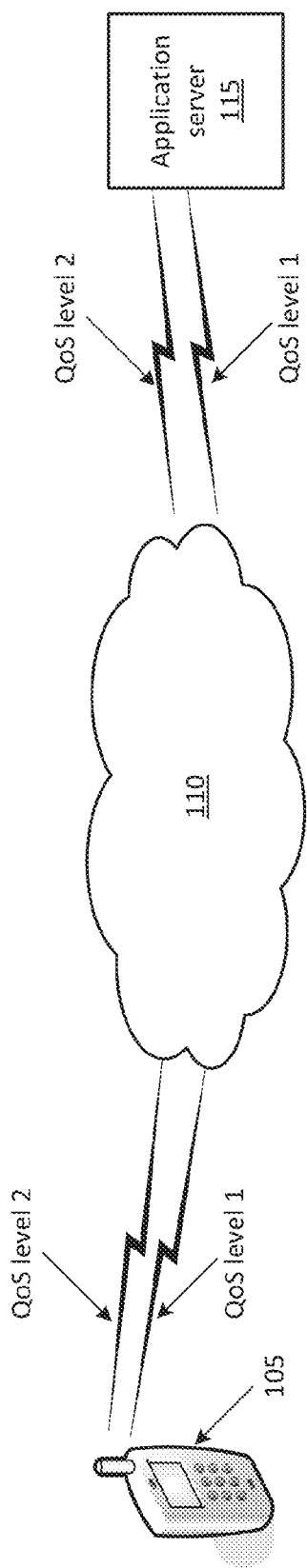
FIG. 1 illustrates an overview of one or more implementations described herein.

As shown in FIG. 1, for example, user device 105 may initiate an online game application that communicates, via network 110, with application server 115 (e.g., an online gaming server). That is, traffic to and/or from the user device may include data related to the game application. The data related to the game application may include control commands (e.g., input by a user of the user device, position of a virtual object in the game application, etc.) and/or other data (e.g., settings, menu information, etc.). In some implementations, and as described in further detail below, a system may provide a particular class of QoS treatment for a certain type of data associated with the game application, such as control commands, and a different class of QoS for other types of data associated with the game application.

For example, in some implementations, the system may allow control commands to be transmitted and/or received by user device 105 with a particular latency—e.g., a relatively low latency. Further, the system may provide a different class of QoS treatment for other data associated with the game application, such as settings, menu information, etc. That is, the system may allow the other data to be transmitted and/or received by the user device with a different latency—e.g., a higher latency than is provided for control commands. These different QoS treatments may be provided by user device 105 itself (e.g., when transmitting traffic and/or when processing incoming traffic), by network components (e.g., when receiving traffic from user devices, providing traffic to user devices, etc.) of network 110, and/or by application server 115.

In order to provide this functionality, an application programming interface ("API") may be provided, in some implementations. Developers of applications may use the API to indicate traffic that may include control traffic and/or other traffic. Network components, such as a Public Data Network Gateway ("PGW") and/or a Policy Charging and Rules Function ("PCRF") may include functionality that provides QoS treatment to control traffic and/or other traffic as requested by applications that are designed according to the API.

Thus, different levels of QoS may be provided to traffic of a single application—e.g., different levels of QoS may be provided to a particular port of a particular Internet Protocol ("IP") address associated with a user device. By providing low-latency QoS to control traffic, the system may provide an improved user experience, due to more responsive feedback based on users' inputs. By providing different (e.g., higher latency) QoS to other traffic, the system may conserve network resources that would be consumed by providing low-latency QoS to the other traffic, even though providing low-latency QoS to the other traffic may not significantly impact users' experience.

Figure 2:
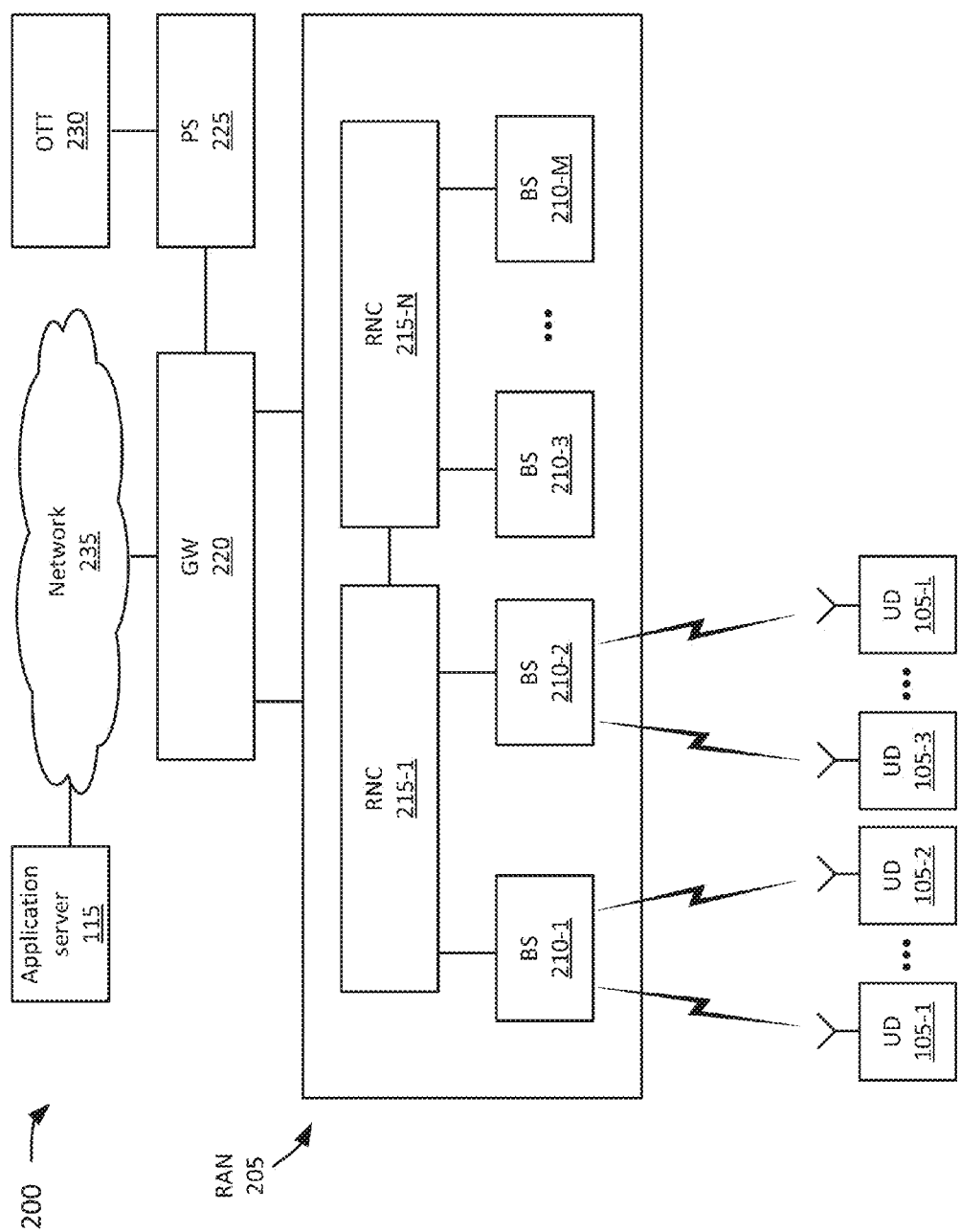
FIG. 2 illustrates of an example system, according to one or more implementations described herein.

FIG. 2 illustrates an example system 200 in which systems and/or methods described herein may be implemented. System 200 may include a group of user devices 105-1 through 105-L (where L is an integer that is greater than or equal to 1) (referred to collectively as "user devices 105," and in some instances individually, as "user device 105"), radio access network ("RAN") 205, gateway server ("GW") 220, policy server ("PS") 225, over-the-top server ("OTT") 230, network 235, and application server 115. Four user devices 105, a single RAN 205, a single GW 220, a single PS 225, a single OTT 230, a single application server 115, and a single network 235 are illustrated in FIG. 2 for simplicity. In practice, additional or fewer user devices 105, RANs 205, GWs 220, PSs 225, OTTs 230, applications servers 115, and/or networks 235 may be used.

Also, in some implementations, a component in system 200 (e.g., one or more of user device 105, RAN 205, GW 220, PS 225, OTT 230, application server 115, and/or one or more network components of network 235) may perform one or more functions described as being performed by another component or group of components in system 200. For instance, a single device, or collection of devices, may, in some implementations, perform the functionality of two or more of GW 220, PS 225, OTT 230, and/or application server 115. Additionally, or alternatively, in some implementations, RAN 205 and/or network 235 may include one or more of GW 220, PS 225, and/or OTT 230. For instance, in some implementations, GW 220 and PS 225 may be network components of network 235. In some implementations, network 235 may correspond to a service provider network (e.g., a network owned and/or operated by a single service provider or a group of service providers).

User device 105 may include one or more devices capable of sending/receiving data and/or voice to/from RAN 205. User device 105 may include, for example, a radiotelephone, a gaming console, a personal communications system ("PCS") terminal (e.g., a terminal that may combine a cellular radiotelephone with data processing and data communications capabilities), a personal digital assistant ("PDA") (e.g., a device that may include a radiotelephone, a pager, Internet/intranet access, etc.), a laptop computer, a tablet computer, or the like.

Application server 115 may include one or more devices that may communicate, via network 230 and/or RAN 205, with user device 105. Application server 115 may execute one or more applications (e.g., one or more gaming applications, chat applications, etc.), and may communicate with user device 105 regarding the one or more applications. For example, user device 105 may execute a gaming application, and may communicate with application server 115 regarding the gaming application (e.g., application server 115 may process information regarding the gaming application, and may send and/or receive information regarding the gaming application to and/or from user device 105).

RAN 205 may include one or more devices for transmitting data and/or voice to user device 105 and network 235. As illustrated in FIG. 2, RAN 205 may include a group of base stations 210-1 through 210-M (where M is an integer that is greater than or equal to 1) (referred to collectively as "base stations 210" and in some instances, individually as "base station 210"), and a group of radio network controllers ("RNCs") 215-1 through 215-N (where N is an integer that is greater than or equal to 1) (referred to collectively as "RNCs 215" and in some instances, individually as "RNC 215").

Base stations 210 may include one or more network devices that receive voice and/or data from RNCs 215 and transmit the voice and/or data to/from user devices 105 via an air interface (e.g., via one or more wireless transceivers associated with base stations 210). Base stations 210 may also include one or more network devices that receive voice and/or data from user devices 105 over an air interface and transmit that voice and/or data to RNCs 215 or other user devices 105.

RNCs 215 may include one or more devices that control and manage base stations 210. Radio network controllers 215 may also include devices that perform data processing to manage utilization of radio network services. RNCs 215 may transmit/receive voice and data to/from base stations 210, other radio network controllers 215, and/or network 230.

RNC 215 may act as a controlling radio network controller ("CRNC"), a drift radio network controller ("DRNC"), and/or a serving radio network controller ("SRNC"). A CRNC may be responsible for controlling the resources of a base station 210. A SRNC may serve a particular user device 105 and may manage connections towards that user device 105. A DRNC may fulfill a similar role to the SRNC (e.g., may route traffic between a SRNC and user device 105).

RAN 205 may correspond to one or more technologies. For example, RAN 205 may correspond to a long term evolution ("LTE") technology. In such an example, base stations 210 may take the form of evolved node Bs ("eNBs"), and RNCs 215 may take the form of mobile management entities ("MMEs"). Four base stations 210 and two RNCs 215 are shown in FIG. 2 for simplicity. In practice, RAN 205 may include additional or fewer base stations 210 and/or RNCs 215. Also, in some instances, a component in RAN 205 (e.g., one or more of base stations 210 and RNCs 215) may perform one or more functions described as being performed by another component or group of components in RAN 205.

GW 220 may provide services relating to providing connectivity between user devices 105 and network 235. For example, GW 220 may provide policy enforcement and/or may be capable of creating bearer channels, via which data may be transmitted from user devices 105 and network 235 and/or vice versa. As will be described further below, GW 220 may establish multiple bearer channels, associated with different QoS levels and associated with a particular application, between user device 105 and network 235. In some implementations, GW 220 may take the form of a public data network gateway ("PGW"), or one or more similar devices.

PS 225 may include one or more devices that provide services relating to policy information storage. For example, PS 225 may store information identifying applications for which traffic may be associated with multiple QoS levels, information identifying subscribers (e.g., user devices 105) associated with multiple QoS levels, etc. PS 225 may provide some or all of the stored policy information to GW 220, which may use this policy information when performing policy enforcement techniques (e.g., verifying whether a particular user device 105 is subscribed to a service in which multiple levels of QoS may be provided for a particular application). In some implementations, PS 225 may take the form of a policy charging and rules function ("PCRF") server, or one or more similar devices.

OTT 230 may include one or more devices that process requests for establishing multiple bearers, for multiple QoS levels, associated with applications. For example, as described below, OTT 230 may receive a request from user device 105, an application server (e.g., application server 115), and/or any other device (e.g., a device that is not a network device of network 235). That is, in some implementations, OTT 230 may serve as an interface between network components of network 235 and other devices that are not network components of network 235. The request may include a request for multiple bearers, associated with different QoS levels, to be created. OTT 230 may forward the request to one or more other devices of network 235, such as PS 225 and/or GW 220. As mentioned above, GW 220 may establish multiple bearers between user device 105 and network 235 based on this request.

Network 235 may include one or more devices that transfer/receive voice and/or data to a circuit-switched and/or packet-switched network. In one embodiment, network 235 may include, for example, a Mobile Switching Center ("MSC"), a Gateway MSC ("GMSC"), a Media Gateway ("MGW"), a Serving General Packet Radio Service ("GPRS") Support Node ("SGSN"), a Gateway GPRS Support Node ("GGSN"), and/or other devices. As mentioned above, in some implementations, network 235 may include one or more of GW 220, PS 225, and/or OTT 230. Network 235 may be a private network and/or a public network, such as the Internet.

Figure 3:
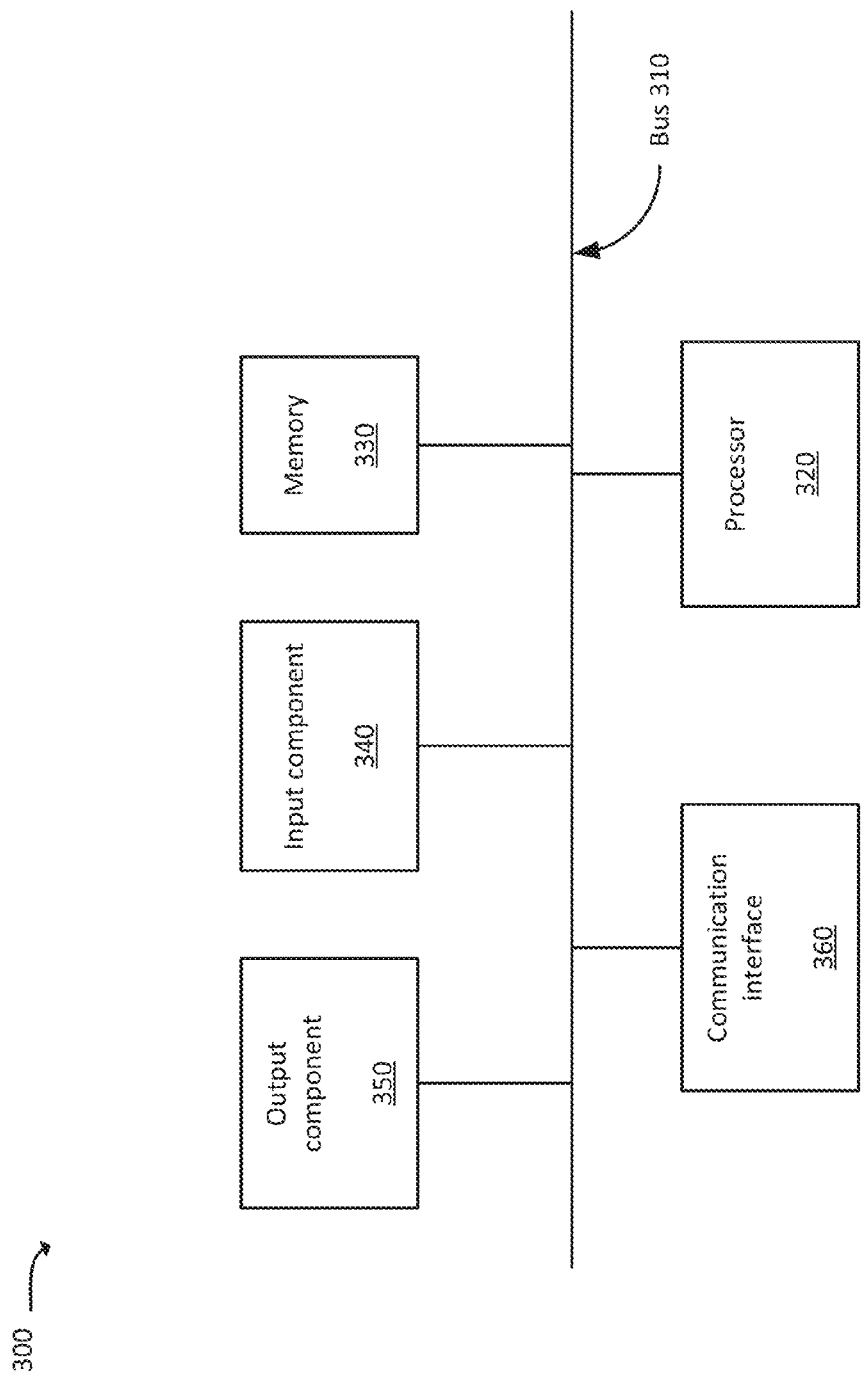
FIG. 3 illustrates example components of one or more devices, according to one or more implementations described herein.

FIG. 3 is a diagram of example components of device 300. Each of the devices discussed above, such as the devices illustrated in FIG. 1, 2, or 6, may include one or more devices 300. Device 300 may include bus 310, processor 320, memory 330, input component 340, output component 350, and communication interface 360. In another implementation, device 300 may include additional, fewer, different, or differently arranged components. Some non-limiting examples of device 300, with additional and/or different components, are discussed below.

Bus 310 may include one or more communication paths that permit communication among the components of device 300. Processor 320 may include a processor, microprocessor, or processing logic that may interpret and execute instructions. Memory 330 may include any type of dynamic storage device that may store information and instructions for execution by processor 320, and/or any type of non-volatile storage device that may store information for use by processor 320.

Input component 340 may include a mechanism that permits an operator to input information to device 300, such as a microphone, a keyboard, a keypad, a button, a switch, etc. Output component 350 may include a mechanism that outputs information to the operator, such as a display, a speaker, one or more light emitting diodes ("LEDs"), etc.

Communication interface 360 may include any transceiver-like mechanism that enables device 300 to communicate with other devices and/or systems. For example, communication interface 360 may include a wireless radio transceiver, which is able to send and/or receive voice and/or data to/and or from one or more devices (e.g., a cellular tower) associated with a cellular network. Additionally, or alternatively, communication interface 360 may include an Ethernet interface, an optical interface, a coaxial interface, or the like. Communication interface 360 may additionally, or alternatively, include a wireless communication device, such as an infrared ("IR") receiver, a Bluetooth radio, or the like. The wireless communication device may be coupled to an external device, such as a headset, a remote control, a wireless keyboard, etc.

As will be described in detail below, device 300 may perform certain operations relating to modifying radio activity of a user device (e.g., user device 105). Device 300 may perform these operations in response to processor 320 executing software instructions stored in a computer-readable medium, such as memory 330. A computer-readable medium may be defined as a non-transitory memory device. A memory device may include space within a single physical memory device or spread across multiple physical memory devices. The software instructions may be read into memory 330 from another computer-readable medium or from another device. The software instructions stored in memory 330 may cause processor 320 to perform processes described herein. Alternatively, hardwired circuitry may be used in place of or in combination with software instructions to implement processes described herein. Thus, implementations described herein are not limited to any specific combination of hardware circuitry and software.

Figure 4:
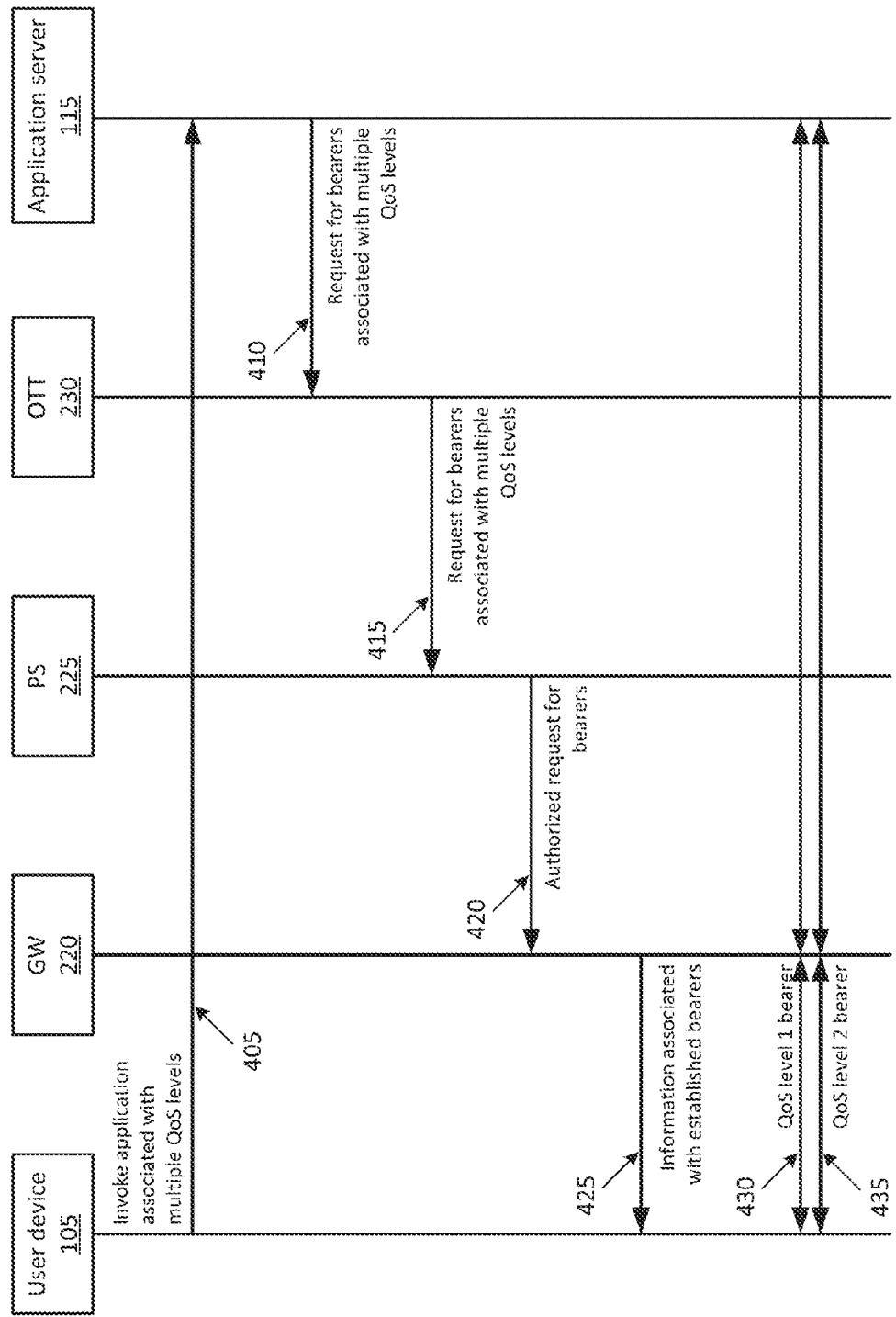
FIG. 4 illustrates example communications for establishing multiple bearers, with multiple QoS levels, for a particular application, according to one or more implementations described herein.

FIG. 4 illustrates example communications for establishing multiple bearers, with multiple QoS levels, for a particular application. For example, assume that user device 105 invokes an application that is associated with multiple QoS levels. The application may be associated with an application programming interface ("API"), which may provide a framework (e.g., software programming tools) for specifying and providing multiple QoS levels. As mentioned above, such an application may be, for instance, a gaming application. The multiple QoS levels may be associated with different classes of traffic, such as low-latency traffic (e.g., control traffic associated with user control input), and other traffic.

User device 105 may output (at 405) information to application server 115, indicating that user device 105 has invoked the application. In some implementations, this information may include information regarding user device 105, such as an identifier of user device 105 (e.g., an IP address, an international mobile equipment identity ("IMEI"), an international mobile equipment identify ("IMSI"), a subscriber identify module ("SIM") number, and/or any other identifier). The information may include connection information, such as one or more port numbers associated with user device 105 and the application, and/or one or more protocols associated with user device 105 and the application. The information outputted at 405 may, in some implementations, indicate an identity of the invoked application (e.g., a name of the application, an identifier associated with the application, etc.).

In some implementations, the information outputted at 405 may include a request for multiple QoS levels associated with the invoked application. That is, in these implementations, this information may include a specific request for multiple QoS levels. In other implementations, the information outputted at 405 may not include a request for multiple QoS levels associated with the invoked application. That is, in these other implementations, the information may not include a specific request for multiple QoS levels. In some of these other implementations, the information may include one or more other indications (e.g., an identification of the application, an indication that the application is associated with the above-mentioned API, etc.), from which it may be inferred that the information outputted at 405 may be associated with multiple QoS levels.

As shown in FIG. 4, user device 105 may output the information, indicating that user device 105 has invoked the application associated with multiple QoS levels, to application server 115. Application server 115 may include a server device that provides services related to the application. For example, assume that the application is a gaming application. In this example, application server 115 may include a gaming server that provides gaming services, such as game control, game status information, game communication services, game authentication services, and/or other gaming services. In some implementations, application server 115 may include one or more server devices that are not within a service provider network (e.g., may interact with one or more components of system 200 through one or more networks).

Application server 115 may identify, based on the information received from user device 105, that user device 105 has invoked the application associated with multiple QoS levels. For example, assume that the received information includes information identifying the application. Application server 115 may compare the identity of this application to a list of applications associated with multiple QoS levels, and determine that the identity of the application matches a particular application in the list.

Application server 115 may, in some implementations, determine a quantity of QoS levels associated with the application. For example, in some implementations, application server 115 may receive and/or store information identifying quantities of QoS levels associated with various applications (e.g., one application may be associated with two QoS levels, another application may be associated with three QoS levels, etc.). In some implementations, applications associated with the API may be associated with one particular quantity of QoS levels (e.g., applications associated with the API may be associated with two QoS levels, applications associated with the API may be associated with three QoS levels, etc.).

In some implementations, application server 115 may identify properties of QoS levels, based on the application and/or the identity of user device 105. For example, one application may be associated with one set of QoS levels, while another application may be associated with another set of QoS levels. For instance, a first application may be associated with a low-latency/low-bandwidth QoS level and a high-latency/high-bandwidth QoS level, while a second application may be associated with a lower-latency/lower-bandwidth QoS level (e.g., lower latency and lower bandwidth than the low-latency/low-bandwidth QoS level associated with the first application) and a high-latency/high-bandwidth QoS level (e.g., the same QoS level as the high-latency/high-bandwidth QoS level associated with the first application, or a different QoS level). While in some implementations, application server 115 may identify properties of QoS levels, in some implementations, application server 115 may forgo identifying properties of QoS levels associated with the invoked application.

Based on identifying that the application is associated with multiple QoS levels, application server 115 may generate a request for multiple bearers associated with the multiple QoS levels. Application server 115 may output (at 410) the request for multiple bearers to OTT 230. This request may include information identifying user device 105 (e.g., IP address, IMEI number, and/or any other information included in the information outputted at 405) and/or information regarding the identified QoS levels (e.g., an identification of the quantity of QoS levels and/or properties associated with the QoS levels).

As mentioned above, OTT 230 may be, or include, a network component of a service provider network (e.g., network 235), and may serve as an interface between components of network 235 and other devices, such as application server 115. As shown in FIG. 4, OTT 230 may receive the request for multiple bearers associated with the multiple QoS levels, outputted by application server 115 at 410.

In some implementations, as mentioned above, this request may include information identifying user device 105 and/or one or more QoS levels associated with the invoked application. In some implementations, as also mentioned above, this request may not include information identifying one or more QoS levels associated with the invoked application. OTT 230 may generate a request, based on the received request, for the multiple bearers associated with the multiple QoS levels. The request generated by OTT 230 may be in a format associated with one or more network components of network 235, such as PS 225. The request generated by OTT 230 may include some or all of the information included in the request outputted by application server 115 at 410 (e.g., information identifying user device 105, information regarding the QoS levels, etc). As shown in FIG. 4, OTT 230 may output the request to, for example, PS 225 (at 415).

PS 225 may receive the request from OTT 230, and may determine whether the request is authorized. For example, PS 225 may identify whether user device 205 and/or the application are authorized for multiple QoS levels. For instance, PS 225 may receive and/or store information identifying user devices and/or users that have subscribed to a service whereby multiple QoS levels may be provided. Additionally, or alternatively, PS 225 may receive and/or store information identifying applications that are authorized for multiple QoS levels.

Additionally, or alternatively, PS 225 may receive and/or store information identifying which QoS levels are authorized for which user devices and/or applications. For example, assuming that the request received from OTT 230 specifies one or more QoS levels, PS 225 may identify whether the specified QoS levels are authorized for user device 105 and/or the invoked application. As another example, assume that the request received from OTT 230 does not specify one or more QoS levels. PS 225 may identify QoS levels that are associated with user device 105 and/or the invoked application (e.g., based on stored and/or received information that correlates particular QoS levels with user device 105 and/or the invoked application).

Assuming that PS 225 determines that the application and user device 105 are authorized for multiple QoS levels, PS 225 may generate a request based on identifying that the application and user device 105 are authorized for multiple QoS levels. This request generated by PS 225 may, in some implementations, include information identifying user device 105 and/or the particular QoS levels associated with user device 105 and the invoked application. As shown in FIG. 4, PS 225 may forward (at 420) the request to GW 220.

Based on receiving the request, GW 220 may establish multiple bearers, associated with the multiple QoS levels, between user device 105 and application server 115. For example, GW 220 may establish multiple bearers 430 and 435, each associated with a particular QoS level, through which user device 105 and application server 115 may communicate. As shown in FIG. 4, GW 220 may output, at 425, information regarding bearers 430 and 435 to user device 105. Additionally, or alternatively, GW 220 may output information regarding bearers 430 and 435 to any other device (e.g., any other device that handles traffic between user device 105 and application server 115).

Bearers 430 and 435 may be associated with a single port of user device 105 and/or of application server 115. For example, in some implementations, a single port of user device 105 may be associated with bearers 430 and 435. In some implementations, a single port of application server 115 may be associated with bearers 430 and 435.

As mentioned above, bearers 430 and 435, which are associated with different QoS levels, may be associated with different classes of traffic associated with the invoked application. For example, one QoS level may be associated with low-latency traffic (e.g., control input commands, real-time application feedback, etc.), while another QoS level may be associated with other traffic (e.g., non-real-time information, high-bandwidth traffic, content upload/download, etc.).

User device 105, GW 220, application server 115, and/or any other intervening device may provide the specified QoS levels. For example, user device 105 may prioritize upload and/or download queue processing based on the QoS levels. For example, assume that user device 105 is associated with an upload queue, which indicates an order in which data will be uploaded from user device 105. Assume that a first unit of data, associated with a first QoS level, is received by the upload queue. Further assume that a second unit of data, associated with a second QoS level, is received by the upload queue after the first unit of data is received by the upload queue. User device 105 may identify that the second unit of data is associated with a higher QoS level (e.g., a lower latency QoS level) than the first unit of data. Based on this identification, user device 105 may reorder the upload queue—that is, user device 105 may upload the second unit of data before uploading the first unit of data, even though the second unit of data was received after the first unit of data.

As mentioned above, GW 220 may also provide the specified QoS levels. For example, when establishing the bearers, GW 220 may specify routing based on the specified QoS levels. For instance, assume that a first routing scheme is associated with a lower latency than a second routing scheme. GW 220 may assign the first routing scheme to one bearer (associated with one QoS level), while assigning the second routing scheme to another bearer (associated with another QoS level). Additionally, or alternatively, GW 220 and/or application server 115 may prioritize upload and/or download queues, using similar techniques as described above with respect to user device 105. Additionally, or alternatively, GW 220, user device 105, and/or application server 115 may employ any other techniques in order to provide the multiple QoS levels.

While FIG. 4 shows communications that may occur between certain devices, it should be understood that the communications shown in FIG. 4 may be direct (e.g., no intervening devices) and/or indirect communications (e.g., one or more intervening devices). In scenarios where communications are indirect, intervening devices have not been illustrated for the sake of clarity. Additionally, in the above discussion, generating a message based on a received message (e.g., OTT 230 generating the request based on the request outputted by application server 115 at 410) may include generating a new message, and/or formatting the received message. Continuing with this example, OTT 230 may, in some implementations, format the request received from application server 115 (e.g., modify the request, add information to the request, remove information from the request, etc.) in accordance with a format associated with PS 225.

Further, while the above discussion of FIG. 4 discussed example functionality of various components according to some implementations, similar functionality may be implemented by one or more other devices. For example, in some implementations, some or all of the example functionality of OTT 230 and application server 115, described above, may be performed by a single device.

Figure 5:
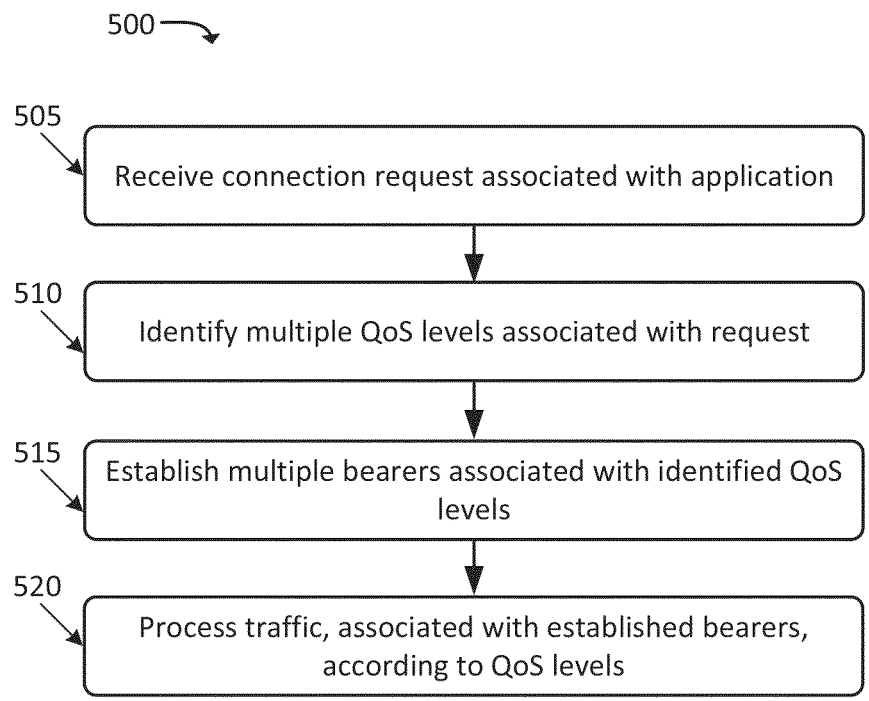
FIG. 5 illustrates an example process for establishing multiple bearers, with multiple QoS levels, for a particular application, according to one or more implementations described herein.

FIG. 5 illustrates an example process 500 for establishing multiple bearers, with multiple QoS levels, for a particular application. In some implementations, process 500 may be performed by one or more components of a network device, such as by GW 220. In some implementations, process 500 may be performed by one or more other components instead of, or possibly in conjunction with, GW 220. For instance, in some implementations, some or all of process 500 may be performed by PS 225, OTT 230, and/or any other device.

Process 500 may include receiving a connection request associated with an application (block 505). For example, GW 220 may receive a connection request from, for example, PS 225. The connection request may be associated with a particular user device, such as user device 105. As discussed above with respect to FIG. 4, the connection request may be received by GW 220 after PS 225 authorizes the connection request (e.g., identifies that user device 105 and/or the application are authorized for multiple QoS levels).

Process 500 may also include identifying multiple QoS levels associated with the request (block 510). For example, the request (received at block 505) may include information identifying multiple QoS levels associated with the application and/or user device 105. Additionally, or alternatively, GW 220 may identify one or more QoS levels based on an identity of user device 105 and/or an identity of the application.

Process 500 may further include establishing multiple bearers associated with the identified QoS levels (block 515). For example, as discussed above with respect to FIG. 4, GW 220 may establish multiple bearers between user device 105 and an application server associated with the application (e.g., application server 115). Each of these multiple bearers may be associated with a different QoS level, as identified at block 510. As mentioned above, when establishing the bearers, GW 220 may, for example, assign routing associated with the bearers based on the identified QoS levels.

Process 500 may additionally include processing traffic, associated with the established bearers, according to the QoS levels (block 520). For example, as discussed above with respect to FIG. 4, GW 220 may process traffic between user device 105 and application server 115 according to the identified QoS levels. For instance, as discussed above, GW 220 may route different classes of traffic, associated with the application and user device 105, based on the different QoS levels. Additionally, or alternatively, and as also discussed above, GW 220 may prioritize input and/or output queues based on the different QoS levels.

Figure 6:
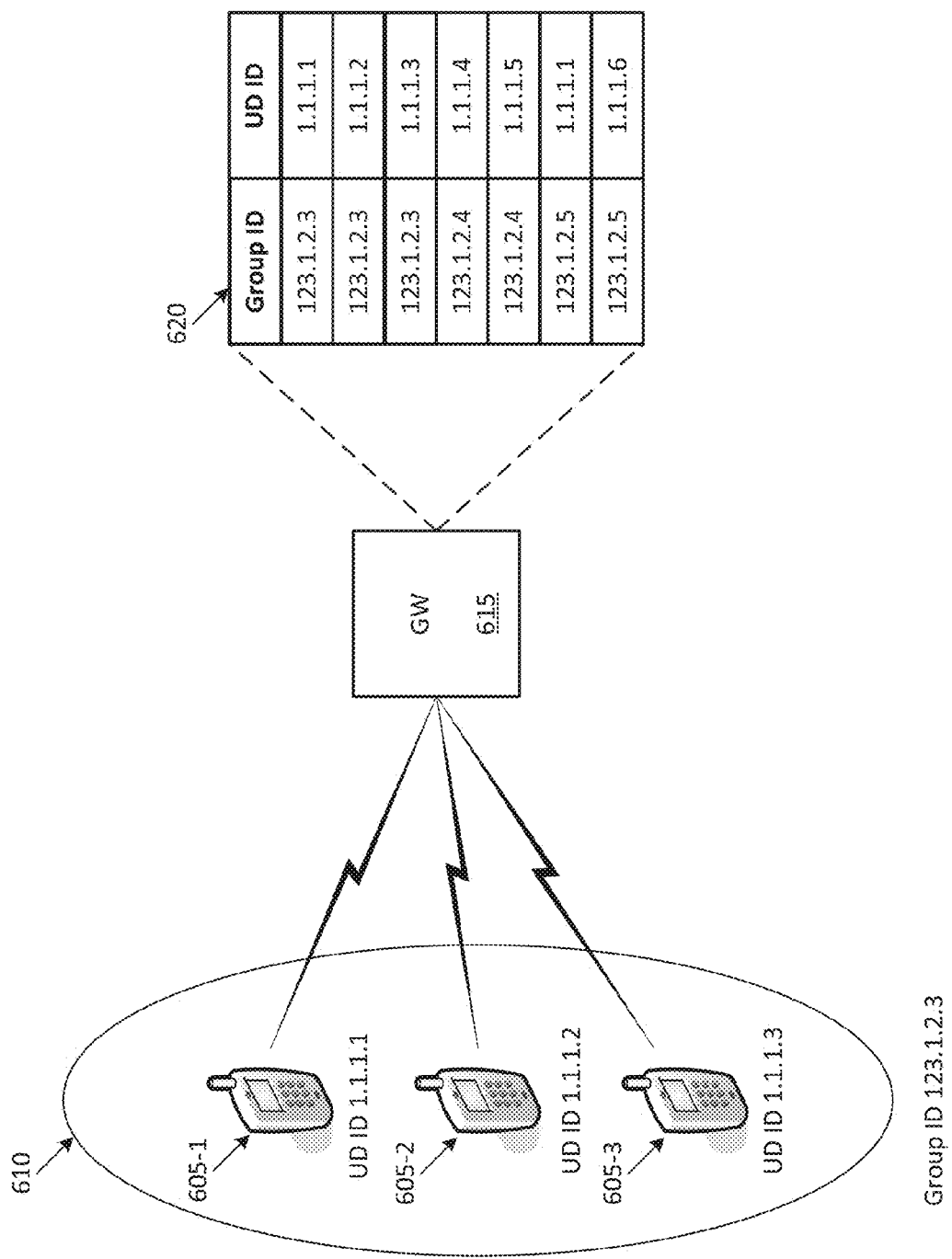
FIG. 6 illustrates an overview of one or more implementations described herein.

FIG. 6 illustrates an overview of processing traffic associated with a group of user devices. For example, a system, according to one or more implementations, may assign a group identifier (e.g., an IP address) to a set of user devices 605-1, 605-2, and 605-3 (hereinafter referred to individually as user device 605, or collectively as user devices 605) that are participating in a session, such as an online gaming session. In some implementations, a particular use device may correspond to, for example, a particular user device 105. As user devices 605 are participating in a session (e.g., are communicating with each other through a server, such as GW 615, which may correspond to, for example, GW 220 in some implementations), user devices 605 may be considered as a group of user devices (e.g., group 610).

In some implementations, GW 615 may generate and/or assign a group identifier (e.g., an IP address or any other identifier) associated with group 610, and may provide the group identifier to each of user devices 605 in group 610. For example, as shown in FIG. 6, GW 615 may store a data structure, such as example data structure 620, which relates group identifiers to associated user devices. As shown, user devices 605 with the user device identifiers ("UD IDs") 1.1.1.1, 1.1.1.2, and 1.1.1.3 may be associated with the group identifier 123.1.2.3. A UD ID for a particular user device 605 may be based on, for example, an IP address associated with the particular user device 605, a Media Access Control ("MAC") address associated with the particular user device 605, and/or any other identifier associated with the particular user device 605.

As also shown, other user devices 605, such as user devices with UD IDs of 1.1.1.4 and 1.1.1.5 may be associated with another group identifier, 123.1.2.4. As further shown, user devices 605 with UD IDs of 1.1.1.1 and 1.1.1.6 may be associated with another group identifier 123.1.2.5. Thus, in some implementations, one or more user devices 605 may be associated with multiple groups 610. Such a situation may arise when, for instance, a particular user device 605 invokes multiple applications that utilize group session communication (e.g., multiple peer-to-peer applications).

When outputting data intended for one or more other user devices in the group, a particular user device 605 (e.g., user device 605-1) in group 610 may output the data, specifying the group identifier as a destination address for the data. GW 615 may identify that this identifier is associated with group 610, and may provide this data to the other user devices 605 in group 610 (e.g., user devices 605-2 and 605-3).

In some implementations, GW 615 may receive acknowledgment messages from one or more of the other user devices 605 in group 610 (e.g., from user device 605-2 and/or 605-3). Upon receiving acknowledgment messages from the other devices 605 in group 610, GW 615 may generate an acknowledgement message associated with the group identifier, and may provide the acknowledgment message to user device 605-1. On the other hand, if GW 615 does not receive acknowledgment messages from one or more of the other devices in the group (e.g., if at least a particular duration of time has expired without receiving an acknowledgment message from one or more of the other devices in the group), then GW 615 may generate a message, associated with the group IP address, indicating that the data from the particular user device has not been received. Based on receiving this message, user device 605-1 may re-send the data, specifying the group identifier as a destination of the data.

Assigning the group identifier may conserve bandwidth and/or other resources. For example, when transmitting data intended for other user devices in a group, a particular user device may transmit the data to GW 615, using the group IP address. GW 615 may provide some or all of this data to the other user devices in the group. As is apparent from this example, the particular user device may forgo transmitting the same data multiple times—e.g., transmit one copy of the data for each user device in the group, thus conserving upload bandwidth and reducing upload latency.

Assigning the group identifier may conserve bandwidth and/or other resources when user devices to join and/or leave a group. For example, assume that user device 605-1 joins a group, in which user devices 605-2 and 605-3 are already present (e.g., are communicating with each other). Further assume that GW 615 has assigned a group identifier for this group (e.g., for a group that includes user devices 605-2 and 605-3). When user device 605-1 joins the group, instead of providing an identifier associated with user device 605-1 (e.g., an IP address of user device 605-1) to user devices 605-2 and 605-3 and/or vice versa, GW 615 may simply provide the group identifier to user device 605-1. In some implementations, GW 615 may forgo informing user devices 605-2 and 605-3 that user device 605-1 has joined the group. Further assume that user device 605-2 leaves the group. GW 615 may store information identifying that user device 605-2 is no longer associated with the group identifier, and may, in some implementations, forgo informing user devices 605-1 and 605-3 that user device 605-2 has left the group.

Thus, a system, according to one or more implementations, may conserve network resources that would be consumed to provide identifiers of user devices to other user devices in a particular group. Further, such a system may provide enhanced security, as identifiers (e.g., IP addresses) of user devices may not be provided to other user devices. By forgoing providing such user device identifiers to other user devices, a system may facilitate the prevention of attacks that use device identifiers.

Figure 7:
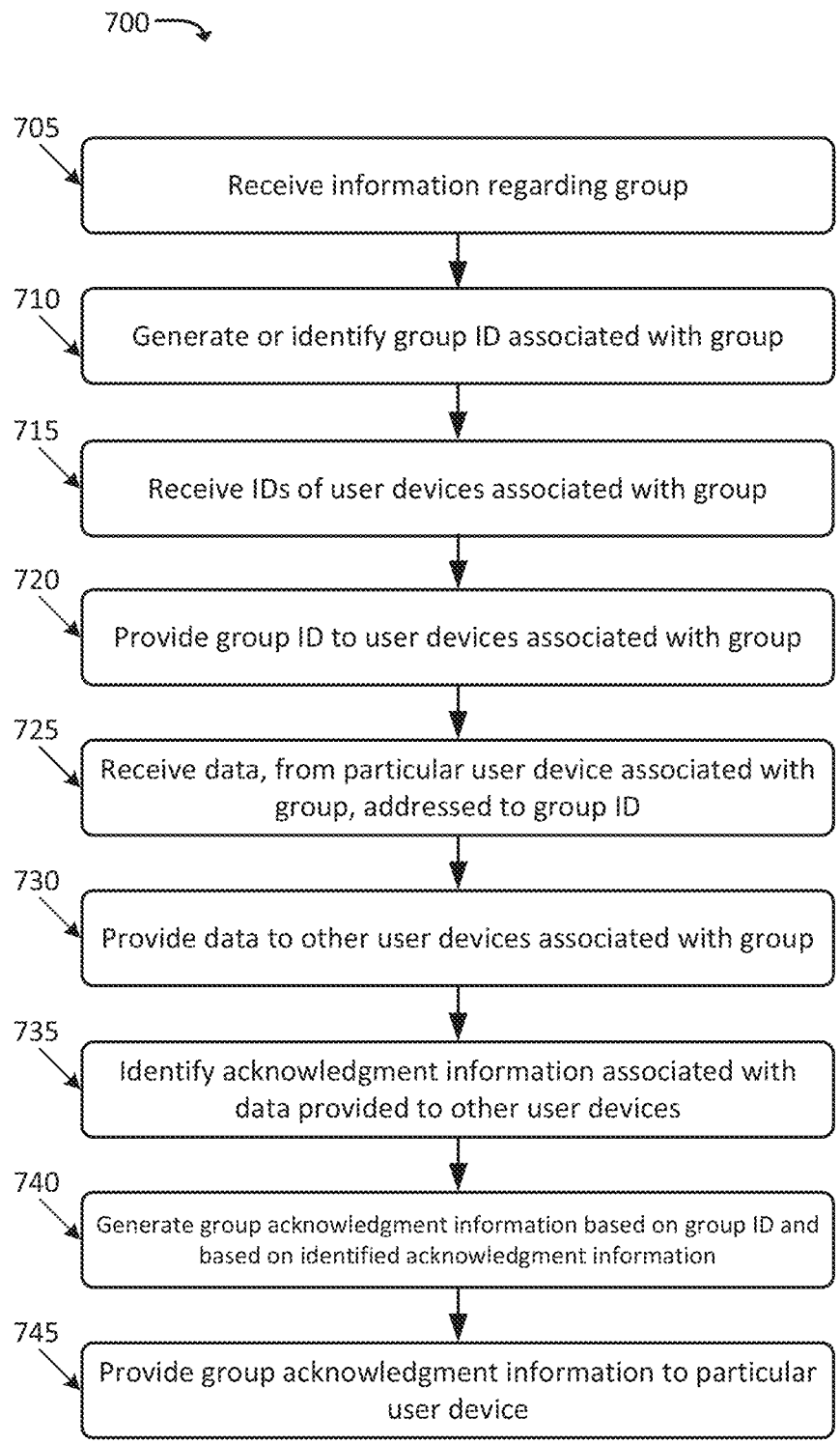
FIG. 7 illustrates an example process for processing group communications, according to one or more implementations described herein.

FIG. 7 illustrates an example process 700 for processing group communications. In some implementations, process 700 may be performed by one or more components of a network, such as by GW 615. In some implementations, process 700 may be performed by one or more other components instead of, or possibly in conjunction with, GW 615.

Process 700 may include receiving information regarding a group (block 705). For example, GW 615 may receive information from user device 605-1, indicating that a particular application has been invoked at user device 605-1. The particular application may be associated with group peer-to-peer communication—e.g., may be a gaming application, a chat application, and/or any other type of application. The group may be associated with, for instance, a gaming session, a chat session, etc. GW 615 may receive the information when, for example, the group is established (e.g., when the application is invoked at user device 605-1).

Process 700 may also include generating or identifying a group identifier associated with the group (block 710). For example, GW 615 may generate a group identifier associated with the group, and/or may select from a pool of group identifiers. That is, in some implementations, GW 615 may store information regarding a set of group identifiers, and may dynamically assign these group identifiers to various groups. A particular group identifier, when assigned to a particular group, may be unavailable for use for other group, and may be released when a session associated with the particular group ends (e.g., may be available for assigning to another group). Continuing with the above example, assume that GW 615 identifies that a group identifier associated with the group, for which information was received at block 705, is 123.1.2.3.

Process 700 may additionally include receiving identifiers of user devices associated with the group (block 715). For example, GW 615 may receive UD IDs associated with user devices 605 in the group. In some implementations, GW 615 may receive the UD IDs when GW 615 receives requests, to join the group, from user devices 605.

Process 700 may further include providing the group identifier to user device(s) associated with the group (block 720). For example, as described above, GW 615 may provide the group identifier (generated or identified at block 710) to user devices 605 (e.g., when each of user devices 605 joins the group).

Process 700 may also include receiving data, from a particular user device associated with the group, that is addressed to the group identifier (block 725). For example, as described above, assume that GW 615 receives data, that is addressed to the group identifier, from user device 605-1.

Process 700 may additionally include providing the data to other user devices associated with the group (block 730). Continuing with the above example, GW 615 may provide the data (or at least a portion of the data) received at block 725 to the other user devices in the group, such as user devices 605-2 and 605-3. For example, GW 615 may generate copies of the data (or at least a portion of the data) received at block 725, and send these copies to the other user devices in the group.

Process 700 may further include identifying acknowledgment information associated with the data provided to the other user devices (block 735). Continuing with the above example, GW 615 may identify whether user devices 605-2 and 605-3 provided an acknowledgment to the data provided at block 730. Assume, for example, that GW 615 receives an acknowledgment from user device 605-2 within a particular amount of time, and does not receive an acknowledgment from user device 605-3 within the particular amount of time. In this scenario, the acknowledgment information for user device 605-2 may indicate that an acknowledgment was received, while the acknowledgment information for user device 605-3 may indicate that an acknowledgment was not received within the particular amount of time (e.g., an acknowledgment window "timed out").

Process 700 may also include generating group acknowledgment information based on the group identifier and based on the identified acknowledgment information (block 740). Continuing with the above example, in some implementations, the group acknowledgment information may include an indication that an acknowledgment was not received from the group (e.g., since an acknowledgment was not received from one user device of the group, the group acknowledgment information may indicate a group "no acknowledgment received" indication). In some implementations, the group acknowledgment information may indicate that an acknowledgment was received from user device 605-2, and that an acknowledgment was not received from user device 605-3.

Process 700 may additionally include providing the group acknowledgment information to the particular user device (block 745). For example, GW 615 may provide the group acknowledgment information, generated at block 740, to user device 605-1. User device 605-1 may, in some implementations, re-transmit the data, using the group identifier as a destination address. In some implementations, where the acknowledgment information specifies from which user devices an acknowledgment was received, user device may re-transmit the data, using user device identifiers associated with these user devices as a destination address.

A system, described herein, may provide multiple QoS levels to a particular application, such as a network-based application being executed by the user device. In some implementations, a system may be configured to facilitate communications between various user devices in a group by utilizing a group identifier in lieu of individual device identifiers associated with user devices in the group.

The foregoing description of implementations provides illustration and description, but is not intended to be exhaustive or to limit the possible implementations to the precise form disclosed. Modifications and variations are possible in light of the above disclosure or may be acquired from practice of the implementations. For example, while series of blocks have been described with regard to FIGS. 5 and 7, the order of the blocks may be modified in other implementations. Further, non-dependent blocks may be performed in parallel. It will be apparent that embodiments, as described above, may be implemented in many different forms of software, firmware, and hardware in the implementations illustrated in the figures.

The actual software code or specialized control hardware used to implement an embodiment is not limiting of the embodiment. Thus, the operation and behavior of the embodiment has been described without reference to the specific software code, it being understood that software and control hardware may be designed based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

No element, act, or instruction used in the present application should be construed as critical or essential unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
   receiving, by one or more server devices, a connection request from a user device,
   the connection request including information identifying a particular application;
   identifying, by the one or more server devices, that the particular application is associated with a plurality of classes of traffic;
   establishing, by the one or more server devices, a plurality of bearer channels that are associated with the plurality of classes of traffic,
   the plurality of bearer channels being associated with a plurality of different levels of quality of service ("QoS");
   processing, via a first bearer channel of the plurality of bearer channels, according to a first level of QoS of the plurality of different levels of QoS, and by the one or more server devices, first traffic associated with the user device and the particular application,
   processing the first traffic according to the first level of QoS further including:
     identifying that a traffic output queue, associated with the one or more server devices, includes the first traffic associated with the first level of QoS and second traffic associated with a second level of QoS,
     the second traffic being associated with the user device and the particular application, and
     the second traffic being received by the traffic output queue before the first traffic; and
     outputting, before outputting the second traffic, the first traffic based on identifying that the first traffic is associated with the first level of QoS; and
   processing, via a second bearer channel of the plurality of bearer channels, according to the second level of QoS, and by the one or more server devices, the second traffic,
   the second bearer channel being different from the first bearer channel, and
   the second level of QoS being different from the first level of QoS.

2. The method of claim 1, where processing the first traffic according to the first level of QoS includes:
   establishing a routing of the first traffic according to one or more criteria associated with the first level of QoS.

3. The method of claim 2, where the one or more criteria include at least one of:
   communication delay criteria, or
   bandwidth criteria.

4. The method of claim 1, where processing the first traffic according to the first level of QoS and processing the second traffic according to the second level of QoS further includes:
   processing the first traffic and the second traffic via a single port associated with the one or more server devices.

5. The method of claim 1, further comprising:
   determining that the user device is authorized for receiving treatment of traffic, to or from the user device, according to multiple QoS levels for the particular application,
   where, when establishing the plurality of bearer channels, the method further includes:
     establishing the plurality of bearer channels based on determining that the user device is authorized to receive treatment of traffic according to the multiple QoS levels for the particular application.

6. The method of claim 1, further comprising:
   storing a list of identifiers of one or more applications that are associated with multiple classes of traffic,
   where, when identifying that the particular application is associated with the plurality of classes of traffic, the method further includes:
     comparing an identifier associated with the particular application to the list of identifiers; and
     identifying, based on the comparing, that the particular application is associated with the multiple classes of traffic.

7. A system comprising:
   one or more devices with circuitry to:
   receive a connection request from a user device, the connection request including information identifying a particular application;
   identify that the particular application is associated with a plurality of classes of traffic;
   establish a plurality of bearer channels that are associated with the plurality of classes of traffic, the plurality of bearer channels being associated with a plurality of different levels of quality of service ("QoS");
   process, via a first bearer channel of the plurality of bearer channels and according to a first level of QoS of the plurality of different levels of QoS, first traffic associated with the user device and the particular application,
   when processing the first traffic according to the first level of QoS, the one or more devices are further to:
     identify that a traffic output queue includes the first traffic associated with the first level of QoS and second traffic associated with a second level of QoS, the second traffic being associated with the user device and the particular application, and the second traffic being received by the traffic output queue before the first traffic; and output, before outputting the second traffic, the first traffic based on identifying that the first traffic is associated with the first level of QoS; and process, via a second bearer channel of the plurality of bearer channels, according to the second level of QoS of the plurality of different levels of QoS, the second traffic, the second bearer channel being different from the first bearer channel, and the second level of QoS being different from the first level of QoS.

8. The system of claim 7, where, when processing the first traffic according to the first level of QoS, the one or more devices are to:

establish a routing of the first traffic according to one or more criteria associated with the first level of QoS.

9. The system of claim 8, where the one or more criteria include at least one of:

communication delay criteria, or
bandwidth criteria.

10. The system of claim 7, where, when processing the first traffic according to the first level of QoS and when processing the second traffic according to the second level of QoS, the one or more devices are further to:

process the first traffic and the second traffic via a single port associated with the one or more devices.

11. The system of claim 7, where the one or more devices are further to:

determine that the user device is authorized for receiving treatment of traffic, to or from the user device, according to multiple QoS levels for the particular application, where, when establishing the plurality of bearer channels, the one or more devices are further to:

establish the plurality of bearer channels based on determining that the user device is authorized to receive treatment of traffic according to the multiple QoS levels for the particular application.

12. The system of claim 7, where the one or more devices are further to:

store a list of identifiers of one or more applications that are associated with multiple classes of traffic, where, when identifying that the particular application is associated with the plurality of classes of traffic, the one or more devices are further to:

compare an identifier associated with the particular application to the list of identifiers; and identify, based on the comparing, that the particular application is associated with multiple classes of traffic.

13. A method comprising:

receiving, by a user device, information associated with a particular application, the information including:

information identifying a first type of traffic associated with the particular application, and information identifying a second type of traffic associated with the particular application;

providing, by the user device, a first level of quality of service ("QoS") to first traffic to or from the user device, the first traffic being associated with the particular application and the first type of traffic, and when providing the first level of QoS, the method includes:

identifying that a traffic output queue, associated with the user device, includes the first traffic and second traffic, the second traffic being received by the traffic output queue before the first traffic; and outputting, based on identifying that the traffic output queue includes the first traffic and the second traffic, the first traffic from the user device before outputting the second traffic; and providing, by the user device, a second level of QoS to the second traffic to or from the user device, the second traffic being associated with the particular application and the second type of traffic, and the first level of QoS being different from the second level of QoS.

14. The method of claim 13, where providing the first level of QoS to the first traffic and providing the second level of QoS to the second traffic include:

outputting the first traffic and the second traffic from a single port associated with the user device.

15. The method of claim 13, where providing the first level of QoS to the first traffic and providing the second level of QoS to the second traffic include:

receiving the first traffic and the second traffic via a single port associated with the user device.

16. The method of claim 13, where providing the first level of QoS to the first traffic includes:

establishing a routing of the first traffic according to one or more criteria associated with the first level of QoS.

17. The method of claim 16, where the one or more criteria include at least one of:

communication delay criteria, or
bandwidth criteria.

18. The method of claim 13, further comprising:

determining that the user device is authorized for receiving treatment of traffic, to or from the user device, according to multiple QoS levels for the particular application; and establishing a plurality of bearer channels that are associated with a plurality of classes of traffic, where, when establishing the plurality of bearer channels, the method further includes:

establishing the plurality of bearer channels based on determining that the user device is authorized to receive treatment of traffic according to the multiple QoS levels for the particular application.

19. The method of claim 18, further comprising:

storing a list of identifiers of one or more applications that are associated with the plurality of classes of traffic.

20. The method of claim 19, further comprising:

identifying that the particular application is associated with the plurality of classes of traffic based on:

comparing an identifier associated with the particular application to the list of identifiers; and identifying, based on the comparing, that the particular application is associated with the plurality of classes of traffic.

* * * * *